United States Patent
Chiaramello

(10) Patent No.: US 9,854,813 B2
(45) Date of Patent: Jan. 2, 2018

(54) ROTOR FOR ALIMENTARY DOUGH KNEADER MACHINES

(71) Applicant: ARTECH S.R.L., Cueno CN (IT)

(72) Inventor: Antonio Chiaramello, Cueno CN (IT)

(73) Assignee: ARTECH S.R.L., Cuneo (CN) (IT)

( * ) Notice: Subject to any disclaimer, the term of this patent is extended or adjusted under 35 U.S.C. 154(b) by 0 days.

(21) Appl. No.: 15/108,960

(22) PCT Filed: Dec. 30, 2013

(86) PCT No.: PCT/IT2013/000372
§ 371 (c)(1),
(2) Date: Jun. 29, 2016

(87) PCT Pub. No.: WO2015/102027
PCT Pub. Date: Jul. 9, 2015

(65) Prior Publication Data
US 2016/0345593 A1 Dec. 1, 2016

(51) Int. Cl.
*B01F 7/18* (2006.01)
*A21C 1/14* (2006.01)
(Continued)

(52) U.S. Cl.
CPC .............. *A21C 1/1405* (2013.01); *A21C 1/02* (2013.01); *B01F 7/0025* (2013.01);
(Continued)

(58) Field of Classification Search
CPC .. B01F 7/00041; B01F 7/165; B01F 7/00275; B01F 2215/0422; B01F 7/18; B01F 7/20;
(Continued)

(56) References Cited

U.S. PATENT DOCUMENTS 4,941,750 A * 7/1990 Bouchez ............. B01F 7/00275
366/147
5,463,937 A 11/1995 Belongia
(Continued)

FOREIGN PATENT DOCUMENTS

CH 704648 A2 * 9/2012 .......... B01F 7/00166
DE 102013219061 B3 * 10/2014 .......... B01F 7/00275
(Continued)

OTHER PUBLICATIONS

International Search Report and Written Opinion for International Application No. PCT/IT2013/000372 (dated Sep. 25, 2014) (11 pages).

*Primary Examiner* — Charles Cooley
(74) *Attorney, Agent, or Firm* — Lucas & Mercanti, LLP

(57) ABSTRACT

A rotor for a kneading machine for alimentary doughs is provided. The rotor has a flat base formed of a plurality of arms and a plurality of mixing paddles restrained to the arms. The mixing paddles are pivotally mounted on the arms about respective axes (E, F) that are parallel to the flat base. The arms are movable between a first operating position, wherein they extend from the arms along a direction (V) that is generally perpendicular to the flat base, and a second operating position, wherein they extend from the arms in opposite directions substantially parallel to the flat base. When the rotor is mounted in a kneading machine, its paddles are proximate to a bottom of the container of the machine in the second operating position, thus acting to separate the dough.

7 Claims, 3 Drawing Sheets

(51) Int. Cl.
  *A21C 1/02* (2006.01)
  *B01F 7/00* (2006.01)
(52) U.S. Cl.
  CPC .......... *B01F 7/00075* (2013.01); *B01F 7/18*
  (2013.01); *B01F 2215/0011* (2013.01)
(58) Field of Classification Search
  CPC ............... B01F 7/0025; B01F 7/00258; B01F
  7/00075; B01F 7/00158; B01F 7/00058;
  B01F 2215/0011; B28C 5/16; B28C 5/12;
  A21C 1/1405; A21C 1/02
  USPC .......................................... 366/325.1, 325.92
  See application file for complete search history.

(56) References Cited

U.S. PATENT DOCUMENTS

| | | | |
|---|---|---|---|
| 6,523,996 B2 * | 2/2003 | Proper | B01F 7/00058 366/314 |
| 6,586,150 B2 * | 7/2003 | Proper | B01F 7/00058 366/314 |
| 6,752,561 B2 * | 6/2004 | Kumar | B01F 7/00008 366/348 |
| 6,756,173 B2 * | 6/2004 | Proper | G03G 9/081 430/108.1 |
| 6,805,481 B2 * | 10/2004 | Kumar | B01F 7/00008 366/314 |
| 6,878,499 B2 * | 4/2005 | Proper | G03G 9/081 430/137.2 |
| 6,899,455 B2 * | 5/2005 | Proper | B01F 7/00058 366/285 |
| 7,235,339 B2 * | 6/2007 | Casalmir | G03G 9/081 366/314 |
| RE41,652 E * | 9/2010 | Proper | G03G 9/081 430/108.1 |
| 2002/0080679 A1 * | 6/2002 | Proper | B01F 7/00058 366/326.1 |
| 2002/0080680 A1 * | 6/2002 | Proper | B01F 7/00058 366/326.1 |
| 2002/0123000 A1 * | 9/2002 | Proper | G03G 9/081 430/111.4 |
| 2002/0155371 A1 * | 10/2002 | Proper | B01F 7/00058 430/137.18 |
| 2003/0198127 A1 * | 10/2003 | Kumar | B01F 7/00008 366/314 |
| 2003/0211416 A1 * | 11/2003 | Proper | G03G 9/081 430/137.2 |
| 2015/0216183 A1 * | 8/2015 | Chiaramello | A21C 1/02 426/504 |
| 2015/0259501 A1 * | 9/2015 | Nakahara | B01D 1/225 521/45 |
| 2016/0270412 A1 * | 9/2016 | Andersson | A21C 1/02 |
| 2016/0345593 A1 * | 12/2016 | Chiaramello | A21C 1/02 |

FOREIGN PATENT DOCUMENTS

| | | |
|---|---|---|
| EP | 2465352 A1 | 6/2012 |
| EP | 2554051 A1 | 2/2013 |
| WO | 2012/122594 A1 | 9/2012 |

* cited by examiner

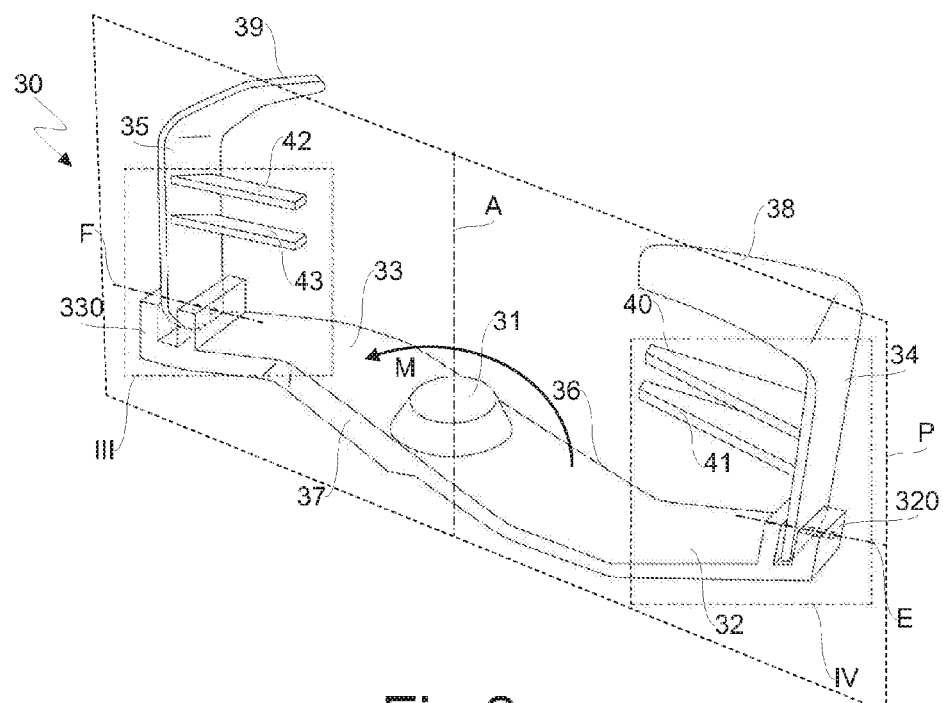
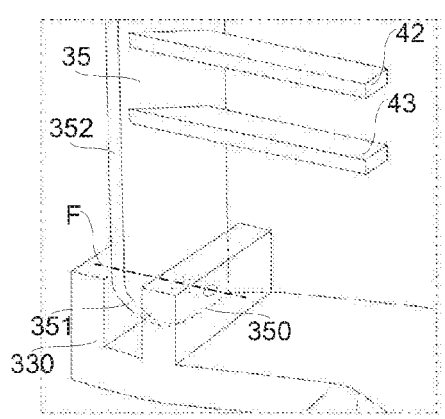 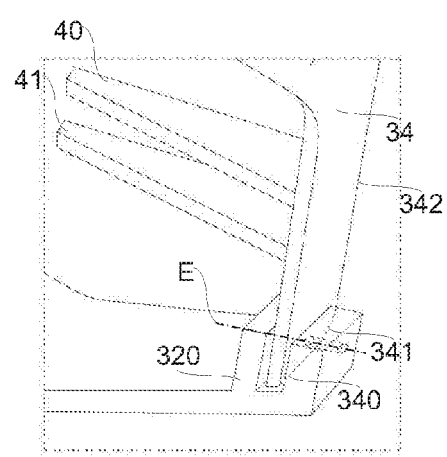
Fig.2
Fig.3  Fig.4

ROTOR FOR ALIMENTARY DOUGH KNEADER MACHINES

CROSS-REFERENCE TO RELATED APPLICATIONS

This application is a 371 of PCT/IT2013/000372, filed Dec. 30, 2013.

Field of the Invention

The present invention generally relates to the field of kneading machines for the production of alimentary doughs and in particular to a rotor for kneading machines.

BACKGROUND OF THE INVENTION

Known kneading machines for both domestic and industrial use comprise a container, which is typically made of stainless steel, wherein a rotor provided with a plurality of mixing paddles is arranged; the rotor is rotatably restrained to the shaft of an electric motor.

In order to make an alimentary dough, a certain amount of ingredients in the solid state, such as mixtures of flour and/or meals, is introduced in the container, wherein they are mixed in a continuous manner by rotating the rotor during the preparation of the dough. In the case of the preparation of alimentary doughs for bread or pastry products, the ingredients in the solid state also comprise yeast.

During the mixing step the container is generally closed by a lid and ingredients in the liquid, e.g. water, solid and/or powdered state necessary to the preparation of the desired dough are gradually added to the ingredients in the solid state. The mixing step continues until a smooth dough suitable to be subjected to further processing is obtained.

The European patent EP 2554051 in the applicant's name describes for example a kneading machine for alimentary doughs comprising a container provided with a tight lid and a rotor arranged proximate to or at the bottom of the container and rotatably restrained about a vertical rotation axis. The kneading machine also comprises a plurality of spray nozzles restrained to the lid, which are arranged and oriented so as to direct their jets towards the bottom and the peripheral walls of the container. The rotor comprises a flat base formed of a plurality of arms and a plurality of mixing paddles extending from the arms predominantly perpendicular thereto. The free ends of the paddles are bent towards the rotation axis of the rotor and inclined relative to its flat base, as well as relative to a plane perpendicular thereto and passing through the rotation axis. Thanks to these characteristics, it is possible to generate swirling mixing movements on planes that are perpendicular to each other, thus promoting mixing of the particles of the mixtures of flours and/or meals with the ingredients injected by the nozzles, and hence enhancing homogenization and hydration of the dough.

Once the preparation step is finished an alimentary dough must be discharged from the container of a kneading machine in order to proceed to further steps and/or processing of the production process. At an industrial level this operation is carried out in an automated way.

It is known that a finished alimentary dough has a remarkable compactness and a generally sticky consistency, thereby making it difficult to discharge it from the container of a kneading machine. While in kneading machines wherein the rotor is rotatably arranged about an horizontal axis the rotor can be removed before discharging the dough, in kneading machines having a vertical axis as the kneading machine of the European patent EP 2554051 this is not possible because the rotor is under the dough relative to the discharging direction.

Consequently, dough residues often remain inside the container of a kneading machine with a vertical rotation axis, which require cleaning operations after discharging of the dough before proceeding to a new preparation step.

SUMMARY OF THE INVENTION

There is therefore the need to improve the discharging mode of an alimentary dough from the container of kneading machines having a rotor with a vertical rotation axis arranged proximate to or at the bottom of the container, which is an object of the present invention.

An idea of solution underlying the present invention is to exploit the rotor that performs mixing of the ingredients of an alimentary dough as a means to facilitate discharging of the dough. To this end the paddles of the rotor are pivotally restrained to the arms of its flat base and are movable between a first operating position, or mixing position, wherein they extend from the arms in a direction that is generally perpendicular to the flat base, and a second operating position, or discharging position, wherein they extend from the arms in opposite directions parallel to the flat base. In the second operating position the rotor paddles are therefore proximate to the bottom of the container, thus being able to act as detachment means of the dough during rotation of the rotor.

The paddles are preferably arranged at the free ends of the rotor arms, thus allowing to work a alimentary dough on the maximum possible width inside the container of a kneading machine.

The rotation axes of the paddles are preferably arranged so that in the second operating position they lie within a circle the radius of which corresponds to the radius of the rotor. This configuration is particularly useful when the rotor is installed in kneading machines wherein during the rotation the rotor occupies almost the whole bottom surface of the container, thus allowing to avoid interference problems or collisions with its peripheral wall.

The rotor further comprises abutment means configured to prevent rotation of the paddles beyond the first and second operating positions. The paddles pivoted on the arms of the rotor in fact tend to rotate by inertia in a direction opposite to its rotation direction.

According to an embodiment of the invention, abutment means may advantageously be realized by exploiting the base and side edges of the paddles, which cooperate with the surfaces of the rotor arms in the first and second operating positions. This configuration is advantageous because it allows to manufacture the rotor cheaply and in a robust and durable way, and is therefore well suited for an industrial use.

The rotor paddles are free to rotate about their respective axes within the limits established by the abutment means, whereby their passage from the first to the second operating position and vice versa may be carried out in an extremely simple way and automatically by reversing the rotation direction of the rotor.

A further advantage provided by the invention is that the rotor may be used with any type of kneading machine employing a rotor with a vertical rotation axis arranged proximate to or at the bottom of the container.

BRIEF DESCRIPTION OF THE DRAWINGS

Further advantages and features of the rotor for kneading machines for alimentary doughs according to the present invention will become clear to those skilled in the art from the following detailed and non-limiting description of an embodiment thereof with reference to the attached drawings in which:

FIG. 2 is a perspective view that schematically shows the rotor of the kneading machine of FIG. 1;

FIGS. 3 and 4 respectively show details III and IV of FIG. 2; and

DETAILED DESCRIPTION OF THE INVENTION

Figure 1:
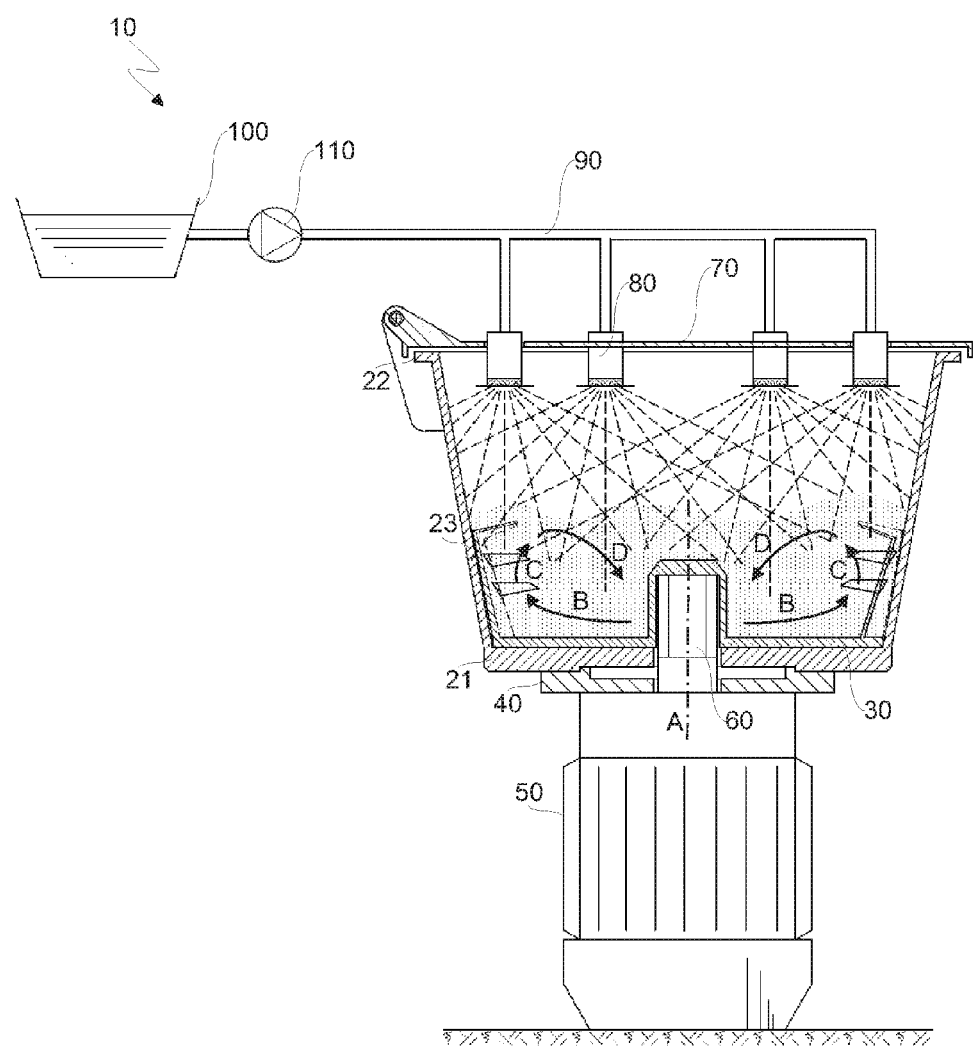
FIG. 1 is a longitudinal sectional view of a kneading machine according to the present invention.

Referring to FIG. 1, a kneading machine is generally indicated by the reference number 10.

The kneading machine 10 comprises in a known manner a container 20, for example made of stainless steel, inside of which in a rotor 30 provided with a plurality of mixing paddles is rotatably arranged. The container 20 includes a bottom 21, an open top 22 adapted to allow introduction of mixtures of flours and/or meals and other ingredients necessary for the preparation of a dough, and peripheral walls 23. In the illustrated embodiment the container 20 has a frustum conical shape that widens from the bottom 21 toward the open top 22.

The container 20 is connected to an electric motor 50 through a suitable supporting structure, such as a flange 40. A shaft 60 of the electric motor 50 protrudes inside the container 20 and is rotatably coupled with the rotor 30 through a splined, threaded, polygonal or similar joint. The rotor 30 is arranged close to or in correspondence with the bottom 21 of the container 20.

The kneading machine 10 further comprises a lid 70 adapted to close, for example hermetically, the open top 22 of the container 20 during operation.

In an operating condition of the kneading machine 10, the rotor 30 has a rotation axis substantially perpendicular to the bottom 21 of the container 20, as well as to a supporting surface of the kneading machine 10, therefore a substantially vertical axis.

The rotor 30 comprises in a known way a flat base formed of a plurality of arms which extend radially outwards from a connecting portion 31 adapted to allow mounting of the rotor on the shaft 60 of the electric motor 50. The rotor 30 also comprises in known manner a plurality of paddles restrained to the arms that form the flat base, the paddles extending from the base in a predominantly perpendicular direction.

With particular reference to FIG. 2, in the illustrated embodiment the flat base of the rotor 30 is e.g. formed of two arms 32, 33 which extend from the connecting portion 31 in opposite directions and the rotor 30 comprises for example a pair of paddles 34, 35 each one of which is restrained to one of the arms 32, 33 for example at their free ends.

As shown in detail in FIG. 2, the arms 32, 33 comprise shaped edges, for example chamfered edges 36, 37, formed along their periphery on the sides intended to face the rotation direction of the rotor 30 during mixing, schematically shown in the figure by an arrow M.

The rotation of the rotor 30 generates a whirling motion on the mixtures of flours and/or meals arranged in bulk in the container 20, which motion generally occurs parallel to the bottom 21 of the container 20, whereby the particles are thrust toward the peripheral walls 23 by centrifugal effect. The chamfered edges 36, 37 formed on the arms 32, 33 instead allow to generate a raising effect of the mixtures of flours and/or meals toward the lid 70, thus finely dispersing their particles.

The kneading machine 10 further includes a plurality of spray nozzles 80 adapted to spray the liquid ingredients necessary for the preparation of an alimentary dough, e.g. water and eggs, into the container 20.

The nozzles 80 are restrained to the lid 70 and are arranged and oriented so as to direct their respective jets towards the bottom 21 and the walls 23 of the container 20, hence towards the mixtures of flours and/or meals. In FIG. 1 the jets sprayed by the nozzles 80 are schematically shown by dashed lines.

The nozzles 80 are connected to water mains or, alternatively, at least to a feeding conduit in turn connected to at least one reservoir adapted to contain the liquid ingredients necessary for the preparation of the dough. Feeding of the liquid ingredients is then carried out under pressure, that is the pressure of the water mains or the pressure set by a pump installed along the supply conduit connected to the container.

In the embodiment illustrated in FIG. 1, the kneading machine 10 comprises for example six nozzles 80 circumferentially arranged and connected to a single supply conduit 90. The supply conduit is in turn connected to a single reservoir 100 downstream of which a pump 110 is arranged. In the longitudinal sectional view of FIG. 1 only four of the six nozzles 80 are visible.

It will be understood that the number of nozzles 80, their arrangement and their orientation with respect to the lid 70, and the number of supply conduits and reservoirs may vary depending on the production requirements. However, in view of the axisymmetric shape of the container 20, an axisymmetric arrangement of the nozzles 80, for example along a circumference coaxial with the rotation axis A, is preferable because it allows to spread the jets delivered by the nozzles in an extremely homogeneous and uniform way.

As described above, the nozzles 80 are arranged so as to direct their jets towards the bottom 21 and the walls 23 of the container 20. In this way, the particles of mixtures of flours and/or meals raised by the chamfered edges 36, 37 formed on the arms 32, 33 of the rotor 30 toward the top 22 of the container 20 meet the ingredients injected in a spray form by the nozzles 80 in countercurrent, thereby being intimately bound thereto and allowing to obtain an extremely homogeneous and elastic dough.

According to the present invention, the mixing paddles are pivotally restrained to the rotor arms about respective axes parallel to its flat base and are movable between a first operating position, or mixing position, wherein which they extend from the arms in a direction that is generally perpendicular to the flat base and a second operating position, or discharging position, wherein they extend from the arms in opposite directions parallel to the flat base.

With reference to FIGS. 2 to 4, the paddles 34, 35 are pivoted on the arms 32, 33, the rotor 30 about axes E, F parallel to its flat base. In order to make a pivot connection of the paddles 34, 35 respective supporting elements 320, 330 are formed on the arms 32, 33 of the rotor 30, the paddles 34, 35 being pivoted thereon by way of respective pins (not shown).

Figure 5:
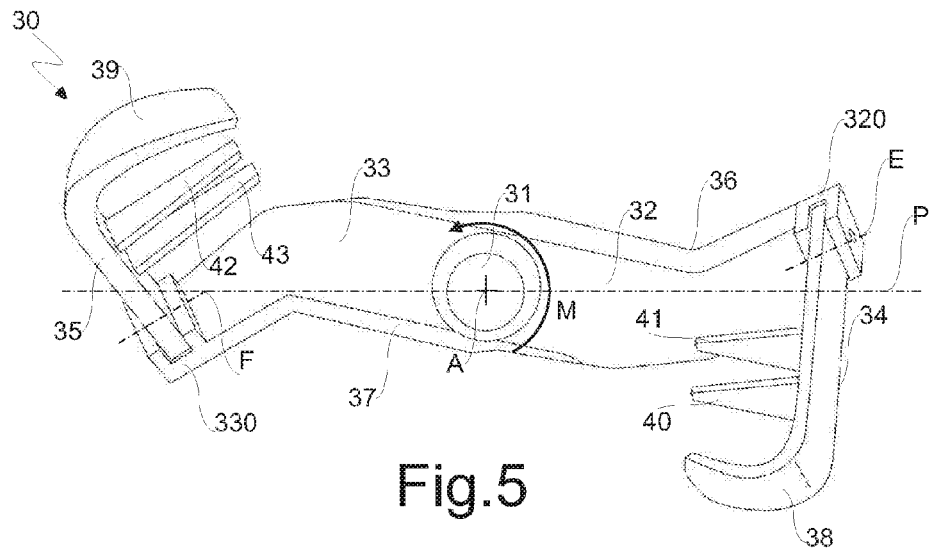
FIGS. 5 and 6 are top views schematically showing the rotor of FIG. 2 with the mixing paddles in the first operating position and in the second operating position, respectively.
Figure 6:
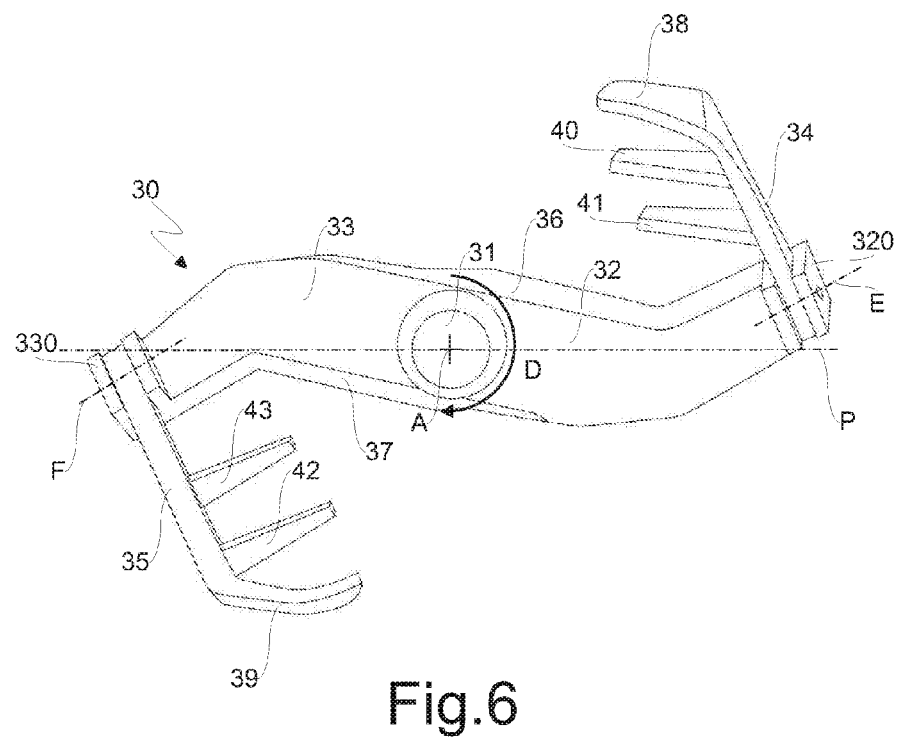

The two operating positions of the paddles 34, 35 of the rotor 30 are shown in particular in FIGS. 5 and 6.

In the first operating position, the paddles 34, 35 are arranged in a direction that is generally perpendicular to the base of the rotor 30, and therefore to the bottom of the container 20, thus allowing mixing of the ingredients of an alimentary dough, whereas in the second operating position they lie substantially parallel to the arms 32, 33 of the rotor 30 near the bottom 21 of the container 20. In this position due to the rotation of the rotor 30, the paddles 34, 35 exert a detachment action of the dough from the bottom 21 of the container 20, thus favoring its discharge from the kneading machine 10.

The rotation axes E, F of the paddles 34, 35 are preferably arranged so that in the second operating position they lie within a circle the radius of which corresponds to the radius of the rotor 30. In this way, in the second operating position, the paddles 34, 35 rotate with the rotor 30 in the container 20 of the kneading machine 10 without interfering with its peripheral wall 23.

Since the paddles 34, 35 are pivoted on the arms 32, 33 of the rotor 30 about axes that are parallel to the flat base of the rotor 30, they tend to rotate by inertia in a direction opposite to the rotation direction of the rotor 30. By exploiting this feature, it is possible to automatically move the paddles 34, 35 from the first to the second operating position and vice versa by simply reversing the rotation direction of the rotor 30.

The rotor 30 includes abutment means (i.e., stops) configured to prevent rotation of the paddles 34, 35 beyond the first and second operating positions. These abutment means (i.e., stops) are arranged proximate to the pivot points of the paddles 34, 35 on the arms 32, 33.

In the illustrated embodiment, the abutment means (i.e., stops) are formed by the side and base edges of the paddles cooperating with the surfaces of the arms 32, 33 of the rotor 30. This solution has the advantages of being extremely simple and inexpensive to implement and does not require installation of additional components on the rotor 30.

With particular reference to FIGS. 3 and 4, the base edges of the paddles 34, 35, i.e. the edges that are arranged close to the arms 32, 33 of the rotor 30, comprise respective flat portions 340, 350 and respective rounded portions 341, 351 subsequent to the flat portions 340, 350. The flat portions 340, 350 and the rounded portions 341, 351 face opposite directions relative to an intermediate plane of the rotor 30, for example a plane P perpendicular to its flat base, passing through the axis A of rotation and through the paddles 34, 35. In particular, the rounded portions 341, 351 precede the flat portions 340, 350 in the mixing direction M.

With reference to FIG. 3, in the first operating position the flat portions 340, 350 contact the surfaces of the arms 32, 33 of the rotor 30 thus creating a rotational constraint that defines the first operating position. When the rotor is rotated in the mixing direction M, the paddles 34, 35 tend to rotate in the opposite direction due to inertia and are held in the first operating position thanks to the rotational constraint described above.

Due to the presence of the rounded portions 341, 351 of the base edges of the paddles 34, 35, by reversing the rotation direction of the rotor 30 as schematically shown by arrow D in FIG. 4, the rotational constraint described above is no longer effective and the paddles 34, 35 rotate in an opposite direction relative to the rotation direction of the rotor 30 about respective axes E, F until their side edges 342, 352 adjacent to the rounded edges 341, 342 of their bases come into contact with the surfaces of the arms 32, 33 of the rotor 30, thus creating another rotational constraint that defines the second operating position.

The rotor 30 may further comprise blocking means (not shown) configured to block the paddles in the first and second operating positions. The blocking means may e.g. be associated with the pins of the paddles 34, 35, or with their supporting blocks 320, 330 formed on the arms 32, 33 and may for example comprise gripping members configured to engage the paddles at their edges or on their surfaces.

The presence of the blocking means is anyway not essential in the invention, because the paddles 34, 35 tend to maintain their operating position simply by inertia during the rotation of the rotor 30.

According to a further aspect of the invention, the rotor 30 may be configured so as to generate inside the container 20 a mixing movement of mixtures of flours and/or meals with the ingredients of swirling type not only with respect to a generic plane parallel to the bottom 21 of the container 20, but also with respect to a generic plane P perpendicular to the bottom 21 of the container 20 and passing through the rotation axis A of the rotor 30. Mixing occurs simultaneously on planes that are perpendicular to each other, thus giving rise to a turbulence whose technical effect is to allow a very high degree of homogenization among the ingredients of the alimentary dough, as well as a very high degree of hydration of the particles of mixtures of flours and/or meals by the liquid ingredients injected by the nozzles 80, which remarkably increases the elasticity of the dough, as well as its workability and storage life. The mixing mode on planes that are perpendicular to each other also allows to prepare alimentary doughs in extremely short times compared to the mixing times that characterize kneading machines known in the art.

To this aim, as shown in particular in FIGS. 2 to 4, the free ends 38, 39 of the paddles 34, 35 are bent towards the rotation axis A of the rotor 30 and inclined relative to both the flat base of the rotor 30 and the plane P perpendicular thereto and passing through its rotation axis A and through the paddles 34, 35. The orientation of the free ends 38, 39 is such that during rotation of the rotor 30 the particles of mixtures of flours and/or meals raised from the bottom 21 of the container 20 are thrust towards the rotation axis A of the rotor 30 and therefore towards the bottom 21 of the container 20, where they are again raised by the rotor 30 as described above.

Taking as reference a generic plane perpendicular to the bottom 21 of the container 20 and passing through the rotation axis A of the rotor 30, such as e.g. the plane of the longitudinal section shown in FIG. 1, the overall effect is that of a swirling motion making the particles of mixtures of flours and/or meals to circulate from the bottom 21 of the container 20 towards its peripheral walls 23 and from these ones towards the rotation axis A of the rotor 30 and then back towards the bottom 21 of the container.

The swirling motion of the particles of mixtures of flours and/or meals, shown in FIG. 1 by a plurality of dots, is schematically illustrated by a series of arrows. In particular, arrows B and C show the raising action of the particles of mixtures of flours and/or meals from the bottom 21 of the container 20 towards the peripheral walls 23 and the lid 70 exerted by the chamfered edges 36, 37 of the arms 32, 33 of the rotor 30, while arrows D show the returning action of the particles towards the bottom 21 of the container 20 exerted by the bent ends 38, 39 of the paddles 34, 35 of the rotor 30.

Still in order to generate turbulence effects when mixing the ingredients of an alimentary dough, the rotor 30 may advantageously comprise a plurality of fins formed on the mixing paddles.

In the illustrated embodiment, four fins are schematically shown, which are marked by reference numbers 40, 41, 42, 43; the fins are arranged e.g. in pairs on each paddle 34, 35. Similarly to the free ends 38, 39 of the paddles 34, 35, the fins 40, 41, 42, 43 are bent towards the rotation axis A of the rotor 30 and inclined both relative to its flat base and to the plane P perpendicular thereto it and passing through its rotation axis. Therefore, during rotation of the rotor 30 the particles of mixtures of flours and/or meals raised from the bottom 21 of the container 20 are also driven by the fins 40, 41, 42, 43 towards the rotation axis A of the rotor 30 and subsequently toward the bottom 21 of the container 20 where they are raised again by the rotor 30 as described above.

The paddles 34, 35 restrained to the arms 32, 33 may advantageously be inclined relative thereto, i.e. relative to the flat base of the rotor 30, radially outwards and also inclined in opposite directions with respect to the plane P.

During the rotation of the rotor 30, the inclination of the paddles 34, 35 relative to the arms 32, 33 allows to generate an additional raising effect of the mixtures of flours and/or meals contained in the container 20, which contributes to the raising effect generated by the chamfered edges 36, 37 formed on the arms 32, 33, thus helping to finely disperse the particles during their mixing with the ingredients injected by the nozzles 80. Moreover, the inclination of the paddles 34, 35 relative to the plane P promotes the swirling motion of the mixtures of flours and/or meals parallel to the bottom 21 of the container 20.

As explained above, this particular configuration of the paddles 34, 35 of the rotor 30 allows to increase mixing effectiveness of the ingredients of an alimentary dough. It will be understood that this result characterizes the first operating position of the paddles 34, 35.

The same configuration is particularly effective also in the second operating position of the paddles 34, 35, when the rotor 30 is driven in a rotation direction D opposite to the mixing direction M in order to facilitate discharging of a finished dough from the container 20.

As explained above, in fact, the surfaces of the paddles 34, 35, of their respective free ends 38, 39 and of those of the fins 40, 41, 42, 43 associated therewith serve as detaching members of the dough substantially over the whole surface of the bottom 21 of the container 20.

Moreover, the inclination of these surfaces is such that in the second operative position they are arranged in a wedge-like manner relative to the rotation direction D opposite to the mixing direction, which has the effect of urging the dough towards the top of the container 20, thus further facilitating its discharge from the kneading machine 10.

The present invention has herein been described with reference to preferred embodiments thereof. It will be understood that there may be other embodiments relating to the same inventive idea, as defined by the claims set forth below.

The invention claimed is:

1. A rotor for kneading machines for alimentary doughs, said rotor comprising:
    a flat base formed of a plurality of arms, and
    a plurality of mixing paddles restrained to said arms,
    wherein said mixing paddles are pivotally mounted on the arms about respective axes (E, F) that are parallel to said flat base, the paddles being movable between a first operating position,
    wherein they extend from the arms along a direction that is generally perpendicular to the flat base, and a second operating position, wherein they extend from the arms in opposite directions substantially parallel to the flat base and in that the rotation axes (E, F) of the paddles are arranged such that in the second operating position the paddles are within a circle the radius of which corresponds to the rotor radius,
    wherein the rotor is further adapted so that base edges of the paddles cooperate with surfaces of the arms thereby providing stops limiting the rotation of the paddles from extending beyond the first operating position,
    wherein said base edges comprise respective flat portions and respective rounded portions subsequent to said flat portions, and
    wherein said flat portions and rounded portions face away from each other relative to an intermediate plane (P) of the rotor.

2. A rotor according to claim 1, wherein said stops are arranged proximate to the pivot points of the paddles on the arms.

3. A rotor according to claim 1, wherein the rotor is further adapted so that side edges of the paddles cooperate with the surfaces of the arms thereby providing further stops limiting the rotation of the paddles from extending beyond the second operating position, said side edges being arranged subsequent to the rounded portions and to the flat portions of the base edges.

4. A rotor according to claim 1, wherein free ends of the paddles are bent toward a rotation axis (A) of the rotor and inclined relative to the flat base and to a plane (P) perpendicular thereto and passing through said rotation axis (A) and through the paddles the rotor configuration being such that during rotation of the rotor particles of mixtures of flours and/or meals raised by its flat base from the bottom surface of the container of a dough kneading machine are thrust by the free ends towards the rotation axis (A).

5. A rotor according to claim 1, further comprising a plurality of fins formed on the mixing paddles, said fins being bent toward the rotation axis (A) and inclined relative to the flat base, as well as a the plane (P) perpendicular thereto and passing through its rotation axis (A) and through the paddles.

6. A rotor according to claim 1, wherein the paddles restrained to the arms are inclined relative to the flat base radially outwards and are also inclined in opposite directions relative to a plane (P) perpendicular thereto and passing through the rotation axis (A) and through the paddles.

7. A dough kneading machine for alimentary doughs, said machine comprising a container provided with a lid and a rotor according to claim 1, said rotor being arranged proximate to or at a bottom surface of said container rotatably around a vertical rotation axis (A).

* * * * *